United States Patent [19]

Hoshi et al.

[11] 4,343,204
[45] Aug. 10, 1982

[54] OPERATING PEDAL FOR POWER TRANSMISSION IN MOTORCYCLE

[75] Inventors: Norio Hoshi, Fujimi; Tomoyuki Tagami, Asaka, both of Japan

[73] Assignee: Honda Giken Kogyo Kabushiki Kaisha, Tokyo, Japan

[21] Appl. No.: 141,392

[22] Filed: Apr. 18, 1980

[30] Foreign Application Priority Data

Apr. 26, 1979 [JP] Japan ............................ 54-56119[U]

[51] Int. Cl.³ ............................................. G05G 1/14
[52] U.S. Cl. ................................... 74/594.7; 74/551.2
[58] Field of Search .................... 74/547, 551.3, 594.7, 74/562, 524, 551.2; 280/294

[56] References Cited

U.S. PATENT DOCUMENTS 1,870,403  8/1932  Coffing .............................. 74/574
4,030,561  6/1977  Hashimoto et al. ............... 74/594.7

FOREIGN PATENT DOCUMENTS 923528   2/1955  Fed. Rep. of Germany ..... 74/594.7
436103   7/1948  France ................................ 280/294
26624   of 1896  United Kingdom ............... 74/551.2

Primary Examiner—Kenneth Dorner
Attorney, Agent, or Firm—Polster, Polster and Lucchesi

[57] ABSTRACT

A power transmission operating pedal in a motorcycle, wherein a base end of a pedal arm is fixedly secured to a power transmission operating shaft projecting from a lateral surface of a power transmission casing, and the other end thereof is joined with a pedal through a vertical shaft in a manner to be collapsible only in the backward direction, and wherein an elastic member is provided along the pedal arm to maintain the pedal at its pedalling position by its restitutive action.

2 Claims, 3 Drawing Figures

OPERATING PEDAL FOR POWER TRANSMISSION IN MOTORCYCLE

BACKGROUND OF THE INVENTION a. Field of the Invention

This invention relates to an operating pedal for a power transmission in a motorcycle, and, more particularly, it is concerned with such a power transmission operating pedal which can be bent or collapsed only in the rearward direction to avoid any shock to the vehicle even when the pedal hits an obstacle such as stone, wooden block, etc. during running of the vehicle.

b. Description of Prior Arts

Various constructions of collapsible operating pedal for the power transmission in the motorcycle have heretofore been proposed.

For example, laid-open Japanese utility model application No. 50-6049 discloses a pedal reinstating device in a motorcycle, in which a pedal arm is fixedly connected at one end thereof with a rotational shaft provided at a lower part of the motorcycle body, and is pivotally connected at its other end with an operating pedal. Within this pedal a cylindrical recess is formed in its axial direction facing the mutual slide contacting surface between this tip end of the pedal arm and the pedal, into which a pressure piece is fitted in one direction, and a resilient member to bias this pressure piece toward the other direction is accommodated in this cylindrical recess. At the same time, a fitting part is formed in the tip end of the pedal arm at a position rightly opposite to the pressure piece to enable the same to fit slidingly into this fitting part, and a cam surface is further formed in the shape of a smoothly curved continuous surface from this fitting part. This cam face is formed in such a manner that a distance from the pivotal point of the pedal arm and the pedal may be gradually lengthened as the cam face is away from the fitting part.

Another laid-open Japanese utility model application No. 50-39946 discloses a change pedal for a motorcycle, in which the base end of a change lever is fitted onto a rotational shaft projected from the lateral side of an engine casing, a vertical shaft is provided at the other end of the change lever, to which the base end of the pedal is pivotally fitted, and the pedal is energized by a spring provided around the vertical shaft so that it may always be kept at its normal position.

Further, laid-open Japanese patent publication No. 53-1710 discloses a change pedal for a motorcycle, in which one end of a change pedal having holes formed therein is pivotally connected by means of a tightening bolt and nut with one end of an operating lever through holes perforated therein, and a spring having supporting legs is fixed on a pin held in other holes formed in the medal, whereby the pedal may possibly be collapsed in the rearward direction when it hits an obstacle.

The change pedals for the motorcycle of the conventional structure as has been stated in the forgoing are generally of such construction that the spring is provided around a rotational shaft of the pedal, on account of which a cavity is required to be formed in the body of the pedal. Consequently, the rotational shaft has small contact arms with the bearing surface of the pedal along its whole length as well as in entire periphery. In other words, since no sufficient bearing surface is secured with the rotational shaft, there is high possibility of the pedal and the rotational shaft becoming loose and shaky owing to their use over a long period of time.

SUMMARY OF THE INVENTION

The fundamental object of the present invention is to provide a power transmission operating pedal for a motorcycle, which successfully removes the defects inherent in the conventional structure of the power transmission operating pedal, and increases the contact area between the rotational shaft and the bearing surface over the total length and the entire periphery of the shaft so as to reduce wear and tear between them and to be free from loosening.

It is another object of the present invention to provide the power transmission operating pedal of a motorcycle, which can be compact in size and durable in structure, even when it is cast in aluminum or aluminum alloys.

It is still another object of the present invention to provide the power transmission operating pedal of a motorcycle, which has eliminated a cavity from the pedal in the surrounding region of the rotational shaft, thereby preventing mud from intruding into the cavity and adhering to the rotational shaft during long period of its use to cause poor operation (difficulty in rotation of the pedal around the shaft).

According to the present invention, generally speaking, there is provided an operating pedal for power transmission in a motorcycle which comprises: a) a power transmission operating shaft projecting outwardly of a lateral surface of a power transmission casing; b) a pedal arm with one end thereof being fixedly secured to the shaft; c) a pedal fitted at the other end of the pedal arm through a vertical shaft in a manner to be collapsible only in the backward direction; and d) a resilient member which is provided along the length of the pedal arm and maintains the collapsible pedal at its pedalling position by the pulling action of the resilient member.

There has thus been outlined, rather broadly, the more important feature of the present invention in order that the detailed description thereof that follows may be better understood, and in order that the present contribution to the art may be better appreciated. There are, of course, additional feature of the invention that will be described hereinafter and which will form the subject of the claims appended hereto. Those skilled in the art will appreciate that the conception, upon which this disclosure is based may readily be utilized as a basis for the designing of other structures for the carrying out of the several purposes of the present invention. It is important, therefore, that the claims be regarded as including such equivalent construction so far as they do not depart from the spirit and scope of the present invention.

BRIEF DESCRIPTION OF ACCOMPANYING DRAWING

Specific embodiment of the present invention has been chosen for the purpose of illustration and description, and are shown in the accompanying drawing, forming a part of the specification, in which.

DETAILED DESCRIPTION OF PREFERRED EMBODIMENT

Figure 1:
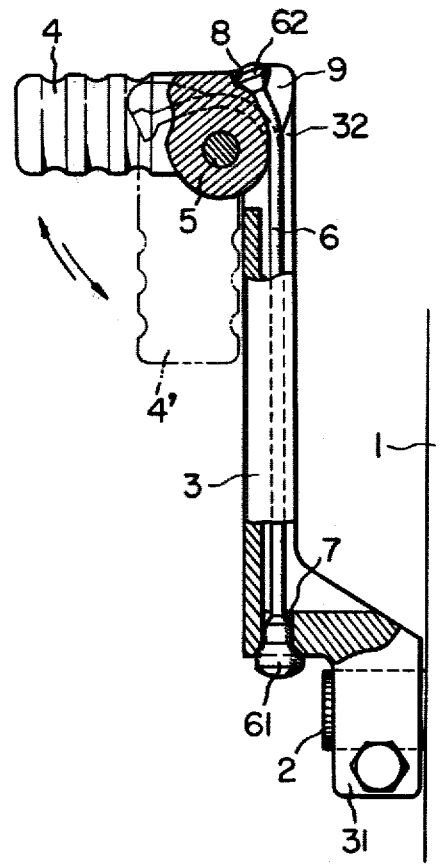
FIG. 1 is a plan view, partly cut away, of the power transmission operating pedal according to the present invention.
Figure 2:
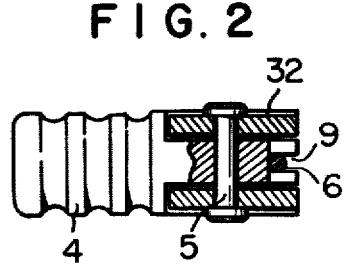
FIG. 2 is a side view, partly in cross-section, of the power transmission operating pedal according to the present invention.

In the following, construction and operations of the power transmission operating pedal according to the present invention will be explained in detail in reference to the accompanying drawing.

A power transmission operating shaft 2 projects outside from the lateral surface of a power transmission casing 1. Onto this operating shaft 2, there is fixed a base end 31 of a pedal arm 3 having a U-shaped or tubular cross-section.

The pedal arm 3 extends forwardly in the longitudinal direction of the vehicle body and a pedal 4 is rotatably fitted at the tip end 32 thereof through a vertical shaft 5 in a manner to extend sidewise (i.e. in a direction perpendicular to the lengthwise direction of the vehicle body).

In the hollow cavity of the U-shaped or tubular pedal arm 3, there is extended a tension spring member, which in FIG. 1 is shown as an elastic, e.g., rubber, band 6 and in FIG. 4, as a helical tension coil spring 6'. This spring member 6 extends in a tensioned state from one end to the other end of the pedal arm 3. One end 61 of the spring member 6 is hooked at a position in the vicinity of the base end 31 of the pedal arm 3, while the other end 62 thereof is hooked at a position forward of the rotational center (the shaft 5) of the pedal 4. The spring member 6 may be any kind of resilient material such as a coil spring, a rubber cord, and so forth.

The end 61 of the tension spring member 6 is made larger than a through-hole 7 therefor, while the end 62 is made smaller than the through-hole 7. The large end part 61 is hooked at the entrance of the through hole 7 with its head protruded outside, while the small end part 62 is hooked inside a recess 8 formed in one part of the pedal 4 near the rotational center 5 by laying it along a groove 9 continuing the recess 8.

Figure 3:
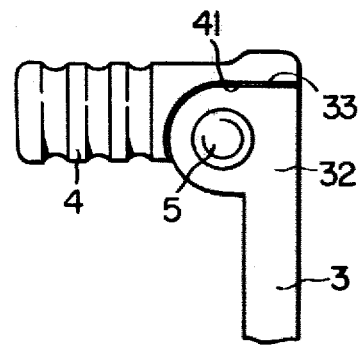
FIG. 3 is a plan view of the pedal as rotatably fitted on the tip end of a pedal arm.

Accordingly, the pedal 4 can usually be maintained securely at its position for use (i.e., pedalling position) with its stopping surface 41 being in contact with the end surface 33 of the pedal arm 3 by the action of the tension spring member 6, as shown in FIG. 3.

During running of the motorcycle, when the pedal 4 hits an obstacle, it collapses backward as shown by a double dot and dash line 4' in FIG. 1 thereby relaxing the impact force caused by the collision.

When the pedal 4 is collapsed, the tension spring member 6 is stretched to store therein its restitution energy, so that, when the pedal has hit and passed by the obstacle, it quickly returns to its pedalling position by force of the tension spring member 6.

As mentioned in the foregoing, since the power transmission operating pedal according to the present invention uses the tension spring member as the spring means to hold the collapsible pedal 4 at its pedalling position, and this spring member 6 is disposed along the pedal arm 3 with one end 61 thereof being hooked at the base end 7 of the pedal arm 3, and the other end 62 thereof being hooked at the other end 8 of the pedal 4, the pedal 4 is only sufficient to provide the hooking part of the tension spring member 6, hence no necessity for providing a hollow cavity to accommodate a spring in it, as in the conventional structure. As the consequence of this, the pedal 4 can be substantially solid in its form, so that it can maintain sufficient strength even when it is formed in a small size.

Incidentally, the pedal 4 and the pedal arm 3 may be made of the same material such as aluminum, aluminum alloy, etc., or they may be made of different material such as iron and aluminum. In the conventional art, when the pedal 4 is made of aluminum for reducing weight of the vehicle body as the whole, it should have a heavy wall thickness from the standpoint of its mechanical strength, because the spring accommodating cavity must be formed within it, and the total size of the pedal becomes inevitably large. However, according to the construction of the present invention, even when the pedal is made of aluminum, it can be small and compact in size, and yet it is sufficiently durable against any shock imparted to it.

What is claimed is:

1. A pedal assembly for operating a power transmission device in a motorcycle, which comprises:
   (a) a shaft connected at a base end of said shaft with, and for actuating, said power transmission device, said shaft projecting laterally from a side surface of a casing accommodating therein said power transmission device;
   (b) a pedal arm with one end thereof being fixedly secured to said shaft, said pedal arm having an internal groove throughout the length thereof;
   (c) a foot pedal, mounted at the other end of said pedal arm on a pivot shaft carried by said pedal arm perpendicularly to the lengthwise direction of said pedal arm in a manner to permit the foot pedal to be collapsible only in the direction toward the said base end of said shaft; and
   (d) an elastic member provided in said internal groove in said pedal arm to maintain said collapsible pedal at its pedalling position by the resititutive action thereof.

2. The pedal assembly as claimed in claim 1, wherein said elastic member is a rubber cord that has a bulbous head at its one end larger in size than said internal groove in said pedal arm, and is hooked at a position in said pedal arm in the vicinity of its one end fixed on said power transmission actuating shaft in a manner to be protruded outside said one end of the pedal arm, and the other end of which has a bulbous head smaller in size than said bulbous head at said one end thereof and is hooked inside a recess formed in said other end of the pedal arm in continuation to said internal groove and in the vicinity of the center of oscillation of said pedal.

* * * * *